United States Patent [19]

Cavallerano et al.

[11] Patent Number: 4,999,701
[45] Date of Patent: Mar. 12, 1991

[54] HIGH DEFINITION NTSC COMPATIBLE TELEVISION SYSTEM WITH INCREASED HORIZONTAL BANDWIDTH AND REDUCED COLOR ARTIFACTS

[75] Inventors: Alan P. Cavallerano, Ossining; Mikhail Tsinberg, Riverdale; Karl Wittig, New York, all of N.Y.

[73] Assignee: North American Philips Corporation, New York, N.Y.

[21] Appl. No.: 377,780

[22] Filed: Jul. 10, 1989

Related U.S. Application Data

[63] Continuation of Ser. No. 122,148, Nov. 17, 1987, abandoned.

[51] Int. Cl.$^5$ .......................... H04N 11/00; H04N 7/06
[52] U.S. Cl. ........................................ 358/12; 358/141
[58] Field of Search ................ 358/12, 14, 141, 142

[56] References Cited

U.S. PATENT DOCUMENTS

| | | | |
|---|---|---|---|
| 4,245,235 | 1/1981 | Poetsch | 358/14 |
| 4,473,837 | 9/1984 | Tiemann | 358/12 |
| 4,485,401 | 11/1984 | Tan et al. | 358/12 |
| 4,552,904 | 3/1987 | van de Polder | 358/12 |
| 4,605,950 | 8/1986 | Goldberg et al. | 358/11 |
| 4,628,344 | 12/1986 | Glenn | 358/12 |
| 4,631,574 | 12/1986 | LaCicero et al. | 358/14 |
| 4,661,850 | 4/1987 | Strolle et al. | 358/12 |

FOREIGN PATENT DOCUMENTS

| | | | |
|---|---|---|---|
| 3341393 | 6/1985 | Fed. Rep. of Germany | 358/12 |
| 3435562 | 2/1986 | Fed. Rep. of Germany | 358/14 |
| 225786 | 12/1983 | Japan | 358/12 |
| 158785 | 8/1985 | Japan | 358/12 |

Primary Examiner—John W. Shepperd
Attorney, Agent, or Firm—Michael E. Marion

[57] ABSTRACT

A system for generating high definition television signals. An augmentation signal is provided for supporting the transmission of additional panel information, increasing the aspect ratio of an NTSC compatible main television signal component. Line differential information, as well as high frequency luminance and high frequency chrominance are transmitted in the augmentation signal super line time interval without frequency interleaving components. The high definition augmentation signal is derived by subsampling the high definition image produced by an HDTV source along the diagonal direction of its two dimensional frequency spectrum. The horizontal frequency bandwidth of the HDTV image is perserved without an objectionable loss of resolution to the human visual system.

19 Claims, 9 Drawing Sheets

HIGH DEFINITION NTSC COMPATIBLE TELEVISION SYSTEM WITH INCREASED HORIZONTAL BANDWIDTH AND REDUCED COLOR ARTIFACTS

This is a continuation of application Ser. No. 122,148, filed Nov. 17, 1987, now abandoned.

RELATED PATENTS AND APPLICATIONS

Extended Horizontal Resolution of Luminance and Chrominance in a High Definition Television System, Ser. No. 084,968, filed Aug. 13, 1987 (now U.S. Pat. No. 4,873,567, issued Oct. 10, 1989);

Improved Method and Apparatus for Recombining a Main Panel Component With an Augmentation Panel Component to Create a Wide Aspect Ratio Television Display, Ser. No. 057,848, filed June 2, 1987 (now U.S. Pat. No. 4,899,220 issued Feb. 6, 1990);

Method and Apparatus for Transmitting Augmentation Panel Components on One Channel of a Two-Channel Wide Aspect Ratio Television Signal Transmission System, Ser. No. 057,847, filed June 2, 1987; and, Decomposition and Recombination of a Wide Aspect Ratio Image, Ser. No.057,849, filed June 2, 1987.

High Definition Television Transmission Systems, U.S. Pat. No. 4,694,338, issued Sept. 15, 1987; continuation application Ser. No. 059,644, filed June 8, 1987;

Method and Apparatus for Demodulating Color Television, Ser. No. 224,203, filed July 22, 1988; continuation of Ser. No. 057,880, filed June 2, 1987, now abandoned;

Two-Line MAC High Definition Television Transmission System, Ser. No. 077,557, filed July 24, 1987;

High Definition NTSC Compatible Television System, Ser. No. 122,148, filed Nov. 17, 1987.

All the above applications have a common assignee.

FIELD OF THE INVENTION

The present invention pertains to high definition, wide aspect ratio television systems which transmit a main component (for example a conventional television signal such as an NTSC compatible signal), and an auxiliary signal for increasing the aspect ratio and horizontal bandwidth of the NTSC compatible signal.

DESCRIPTION OF RELATED ART

The present invention is a further development in the techniques disclosed in the related patent applications, directed to providing compatible television signals, along with an augmentation enhancement signal. The augmentation signal includes additional information for extending the width of an NTSC compatible signal.

Horizontal and vertical resolution is also increased by transmitting a line differential signal, and a high frequency chrominance and luminance component.

In U.S. Pat. No. 4,873,567, there is described a technique for increasing the aspect ratio of a standard NTSC compatible video signal, as well as improving temporal and vertical detail with a line differential signal. Additionally, as part of this disclosure there is a high frequency luminance and chrominance enhancement signal transmitted during a line interval of the augmentation signal. The augmentation signal is organized on the basis of a standard line length wherein panel information, line differential, as well as the high frequency luminance and chrominance information are transmitted.

The foregoing technique employs a separation of the high frequency luminance and high frequency chrominance in the form of Ih and Qh signal components from the original HDTV source. The HDTV source can be an RGB, 525 line progressive, 59.94 Hz, 16:9 aspect ratio source, having 16.8 MHz of horizontal bandwidth. The chrominance components Ih and Qh were alternated between lines such that only one component, Ih or Qh, was transmitted for a selected line. Additionally, the enhancement chrominance components were frequency interleaved with the luminance signal Yh, permitting the transmission of these components simultaneously during a dedicated portion of the augmentation signal line time. The problems associated with interleaving, common to NTSC interleaved video, are however also present with this augmentation signal scheme, the difficulty in separating frequency interleaved signals to avoid cross-over from one signal to the other when demodulating this augmentation signal. The cross-color and color artifacts which are encountered in the system are limitation on the ultimate quality of the reconstituted high resolution video signal. Additionally, some loss of vertical and temporal resolution is encountered when the chrominance components Ih and Qh are transmitted on alternate lines rather than single lines.

The present invention is directed to preserving the horizontal and vertical resolution of both the luminance and chrominance spectrums of a high definition television signal. The augmentation signal includes the panel information, as well as digital data such as stereophonic audio, a training signal, and high frequency enhancement luminance and chrominance information.

SUMMARY OF THE INVENTION

It is an object of this invention to provide an augmentation signal for an HDTV television system.

It is a specific object of this invention to provide an augmentation signal in a high definition television system which increases the aspect ratio, horizontal and vertical bandwidth of a standard video image without frequency interleaving signal components.

These and other objects are provided by a system which generates an augmentation signal occurring during a super line interval which, in a preferred embodiment, is twice that of a conventional, e.g. NTSC line interval. The system supports the transmission of an augmentation signal having additional panel information for increasing the aspect ratio of an NTSC compatible main television component. Line differential information, as well as high frequency luminance and high frequency chrominance are transmitted in the super line interval without frequency interleaving. The high definition augmentation signal is derived by subsampling the high definition image produced by an HDTV source along the diagonal direction of its two dimensional frequency spectrum. This process is tailored to take advantage of the human visual system response, which is less sensitive to diagonal spatial frequencies than purely horizontal or vertical spatial frequencies.

In a preferred embodiment of the invention, the enhancement high frequency luminance and chrominance signals are derived by a process of filtering and decimating the input video signal source.

A high pass filter is employed which will pass the video line signal components having a bandwidth greater than that which is normally supported by the bandwidth of a conventional television signal (e.g. NTSC). The high pass filter signal is vertically decimated such that only one of a plurality of vertical lines for each frame is transmitted as a high frequency enhancement signal. Both the luminance and chrominance components of this decimated signal are produced.

The decimated high frequency luminance signal Yh and high frequency chroma components Ih and Qh are each transmitted in their own individual time slots in the super line time of the augmentation signal. By suitable delays, it is possible to locate a plurality of enhancement signals, for example the individual high frequency luma, high frequency chrominance and quadrature modulated line differential signals, in individual time slots, avoiding any frequency interleaving.

Line differential signals for alternate lines of the high definition television source are transmitted during a distinct dedicated portion of the super line augmentation signal. In a preferred embodiment of the invention, the line differential signals are quadrature modulated on a subcarrier, and the modulated subcarrier signal is transmitted in a portion of the augmentation signal line interval.

The augmentation super line transmission period includes a dedicated portion for transmitting further enhancement signals, for example left and right panels of alternate lines of a wide aspect picture. Digital stereophonic audio, as well as a training signal, can be transmitted during the super line interval.

The foregoing augmentation signal occupies a bandwidth of six MHz lying in a bandwidth defined by the high frequency luminance and chrominance enhancement signal. The line differential signal may be frequency centered within this bandwidth, using an appropriate subcarrier frequency. Thus, the augmentation signal includes a plurality of frequency compatible signals which occur in a different time slot, and require the bandwidth of a standard television frequency channel.

DESCRIPTION OF THE PREFERRED EMBODIMENT

Figure 1:
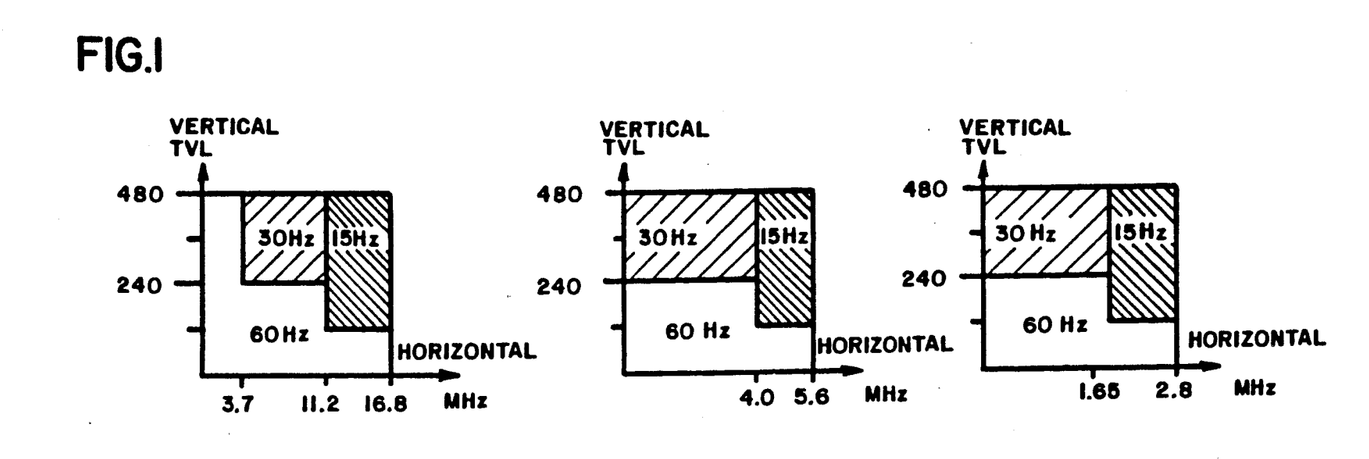
FIG. 1 illustrates the two dimensional luminance and chrominance frequency spectras of a high definition RGB video signal which can be achieved at the receiver with embodiments of the instant invention.
Figure 2:
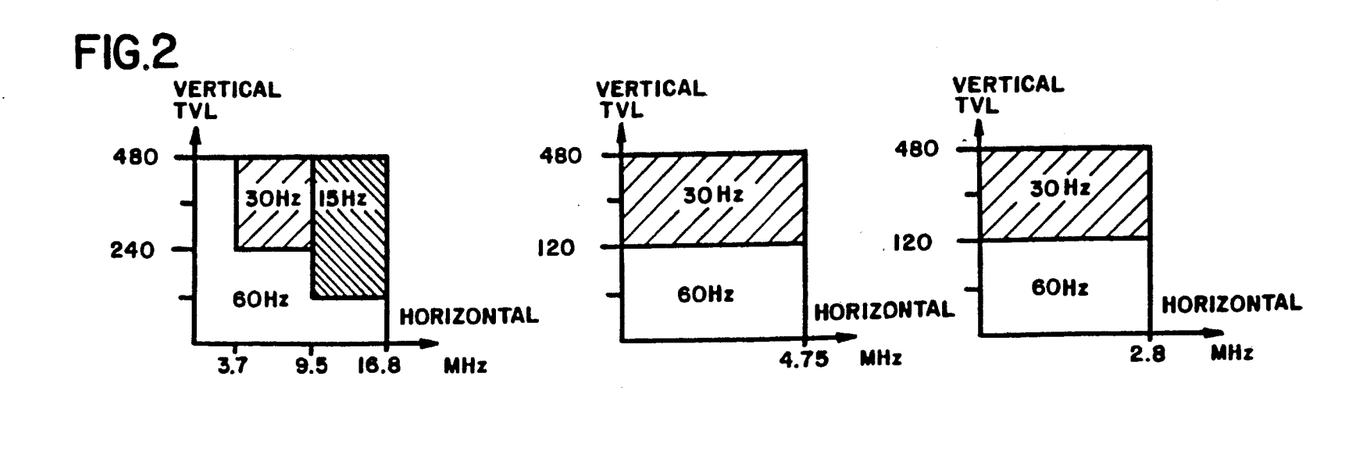
FIG. 2 illustrates the signal frequency spectras of an HD-MAC-60 high definition video signal which can be achieved at the receiver with embodiments of the instant invention.

Referring now to FIGS. 1 and 2, there is shown a two dimensional frequency spectrum at the receiver for luminance and chrominance signals produced from progressive high definition television sources. In FIG. 1 illustrates the spectrum from an RGB 525 line progressive, 59.94 Hz, 16:9 aspect ratio signal having a 16.8 MHz horizontal bandwidth. For convenience, the frame rate may be considered 60 Hz. and subsequent reference will therefore be made to 60 Hz. The spectra, as will be evident from the following discussion, results from the particular line decimation scheme which is described below.

The illustration of FIG. 1 shows the relationship between frame rate, vertical resolution TVL and horizontal resolution. For a frame rate of 60.0 Hz, 480 vertical lines are supported to a bandwidth of 3.7 MHz. Between 11.2 and 16.8 MHz of horizontal bandwidth, 120 lines of vertical resolution are supported at 60 Hz. Utilizing the interlaced nature of the compatible system, it is possible to support more than 240 lines of vertical definition at a frame update rate of 30 Hz. Interlacing requires two full frames of a video signal to transmit horizontal bandwidth between 3.7 and 11.2 MHz.

For those high frequency horizontal details which are transmitted between 11.2 and 16.8 MHz, it is possible to support more than 120 lines of vertical resolution, using a decimation scheme such that an effective frame rate of 15 Hz is derived. By decimating the vertical information, transmitted between 11.2 and 16.8 MHz on a quarter line (basis) i.e., only ¼ of the lines of a total frame are transmitted, in four frames, representing a 15 Hz frame (rate), this information may be reconstituted, using motion compensation and buffer memory.

Thus, in viewing the two-dimensional luminance spectrum of FIG. 1, line differential encoding supports 480 TVL vertical 60 Hz, up to 3.7 MHz horizontal. For that portion of the frequency spectrum between 3.7 and 11.2 MHz, interlacing supports 240–480 TVL vertically at 30 Hz. A technique for decimating on a 4 to 1 basis supports horizontal bandwidths between 11.2 and 16.8 MHz on a 15 Hz frame rate.

As can be seen from FIG. 1, the chrominance I spectrum and chrominance Q spectrum may be similarly encoded. For the I spectrum two hundred forty lines and more of vertical line resolution may be supported up to 4 MHz at a 30 Hz rate. Decimating each of the video lines at ¼ the total line count will permit a full 480 lines of vertical resolution to be supported between 4 and 5.6 MHz at a 15 Hz rate. Thus, it will take four frames to complete the transmission of high frequency horizontal detail between 4 and 5.6 MHz using an appropriate vertical decimation scheme. Similar bandwidths are shown for the chrominance Q spectrum, wherein it is possible to support higher horizontal and vertical bandwidths. Buffer memory and motion detection may be used to improve the temporal updates, or different pre- and post filters with appropriate decimation sequences may be used.

The effect of breaking the horizontal bandwidth up into discrete intervals, the first of which representing standard NTSC video, and a second which is high frequency line information supported at a 15 Hz frame rate, is to subsample the video signal along a diagonal extending from the vertical TVL axis to the highest horizontal frequency 16.8 MHz. As the eye is less sensitive to changes which occur along the diagonal represented by the two-dimensional spectrum diagrams of FIG. 1, this detail may be subsampled spatially and temporally.

FIG. 2 similarly represents the two-dimensional spectrum for an HD-MAC-60 source feed using a vertical decimation scheme. The HD-MAC-60 provides a two-dimensional luminance spectrum which is nearly identical to the RGB source feed. Additionally, the chrominance I and Q spectrums are similar, occupying essentially the same horizontal bandwidth.

Using the foregoing described techniques of line differential encoding and vertical decimation, it is possible to support the HD-MAC-60 signal in the same way, using the same apparatus as is provided with the present invention.

Figure 3:
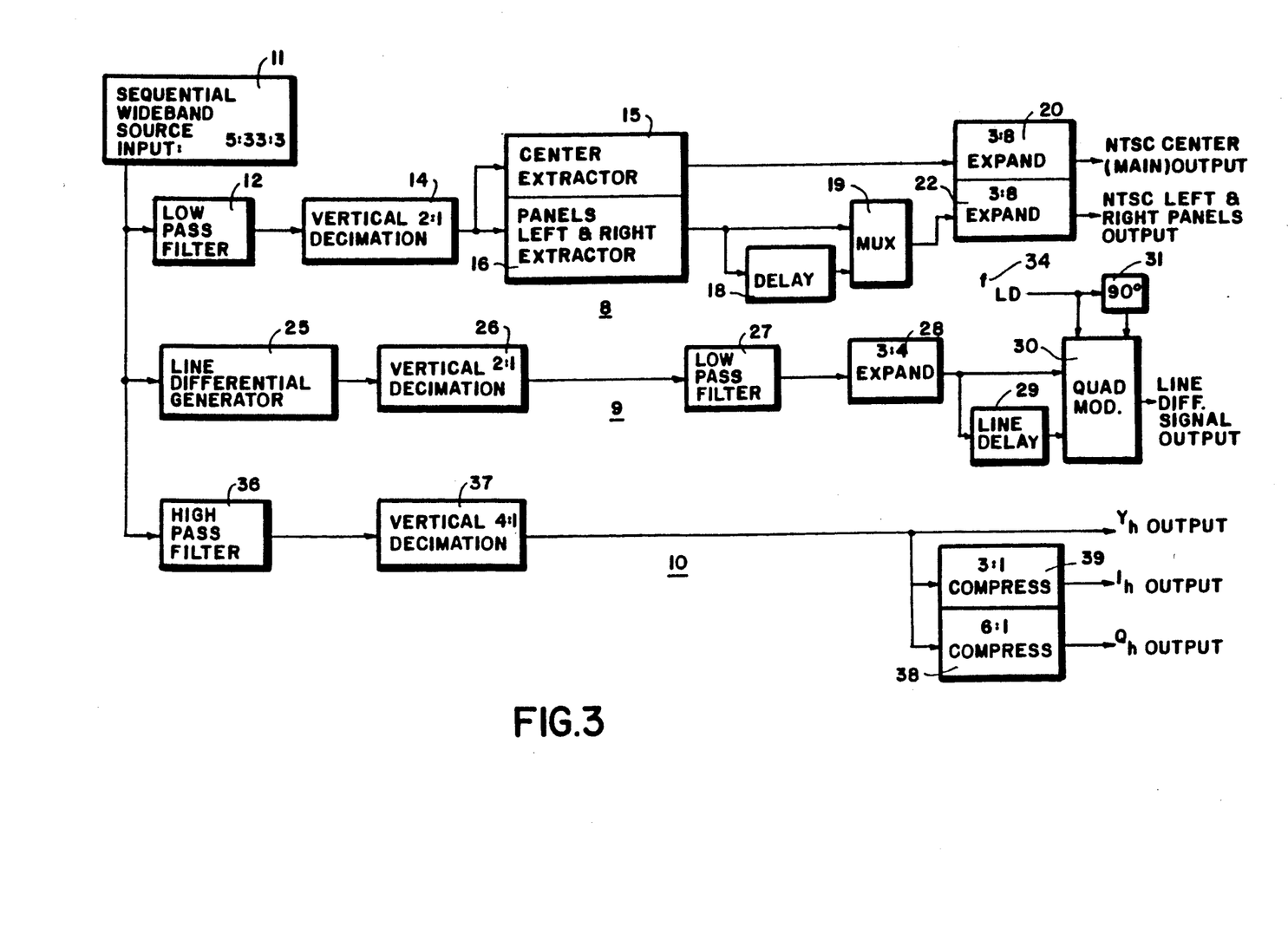
FIG. 3 shows the apparatus for forming an augmentation signal in accordance with one embodiment of the invention.

The generation of an augmentation signal and associated NTSC compatible main signal is illustrated in FIG. 3. Using a wideband sequential source, such as the foregoing RGB progressive scan system, the video signal is supplied to three separate signal processing paths.

The sequential wideband source 11 video signal is divided into three paths, 8, 9 and 10. Path 8 generates an NTSC center signal which, when received by conventional television receivers, displays a conventional NTSC image. Additionally, NTSC left and right panels are generated which will provide a wide aspect ratio picture. The left and right panels are stitched with the NTSC center main signal to provide the wider aspect ratio signal. The NTSC center main signal has an active line time of 52 microseconds, and the respective NTSC left and right panels occupy a total of 17.3 microseconds. Slightly more time in the panel time budget may be provided to allow for panel overlap as described in the related applications referenced above.

The signal path 9 generates a line differential signal. The line differential signal is produced for each line generated by differential generator 25. The line differential signal occurs in a 26 microsecond interval, corresponding to the active line time for the video signal from source 11. The line differential signal LD is the difference between the luminance component of a current line being received, and ½ the sum of the preceding and following line of active video signal luminance. This line differential signal supports during the lower bandwidth portion of the horizontal frequencies, a high vertical resolution of up to 480 lines at 60 Hz.

The line differential signals are decimated in a vertical decimation circuit 26. By decimation it is implied that only a fractional number of the total available lines are passed. In the vertical decimation circuit 26, this occurs on an alternate, 2:1 line basis. The alternate lines are applied to a low pass filter 27. Low pass filter 27 is configured to pass all signals having a horizontal bandwidth of up to 3.7 MHz.

A time expansion circuit 28 is shown to expand the line differential signal to occupy a portion of a total line time for the augmentation signal. The expansion of 3:4 takes advantage of the additional time budgeted in the augmentation channel line signal, as will be apparent when the time frame for this signal is discussed.

The line differential signal is applied to a quadrature modulator 30. Quadrature modulator 30 receives a subcarrier signal fLD' 34, comprising a subcarrier centered at 14 MHz. This subcarrier frequency occurs in approximately the middle of the band allocated to the enhanced high frequency luminance signal Yh and chrominance signals Ih and Qh. A 90° phase shift 31 is provided for one of the carrier signals applied to quadrature modulator 30.

A one line delay 29 is provided such that two consecutive lines of vertically decimated LD signals enter the quadrature modulator 30. A modulated signal, including modulation components which are two consecutive even number line differential signals, is produced symmetrically centered about a subcarrier. Due to the decimation circuit 26 and line delay 29, pairs of line differential signals are quadrature modulated on the subcarrier fLD' 34.

The high frequency enhancement signal, comprising a luminance Yh and two chrominance Ih and Qh components, is provided by signal path 10. A high pass filter 36 is configured to have a lower stop band limit at 11.2 MHz. This will process horizontal detail in the 11.2 to 16.8 MHz region for Yh.

Vertical decimation is also employed by vertical decimation circuit 37 in signal path 10. By vertically decimating at a 4:1 ratio, every fourth line of video signal received from the high pass filter 36 is transmitted. The vertical resolution greater than 120 lines per frame may be intentionally prefiltered, or other decimation schemes allowed for motion compensation memory at the receiver. The chrominance information associated with each line produced by the vertical decimation scheme is also simultaneously produced. Time compression is employed in compressors 38 and 39 to time compress each of the chrominance components Ih and Iq at a 3:1 and 6:1 time compression.

The vertical decimation circuit 37 is employed so that for each frame, decimation begins at the subsequent line from a previous frame. Thus, it is clear that after four frames have been received, each line of the sequential wide band signal from source 11 has been received after filtering through high pass filter 36 as an enhancement signal.

The main signal path 8 generates the NTSC center main signal and the NTSC left and right panels which are stitched to the main signal to provide the wide aspect ratio signal. The technique for deriving this NTSC compatible signal is the same as that proposed in the earlier high definition television transmission system. A low pass filter 12 has an upper band stop frequency of approximately 11.2 MHz. The number of active lines from the sequential wide band source video signal is decimated in a 2:1 relationship by vertical decimation circuit 14. The decimated signal is applied to a center extractor 15 and a panel extractor 16. Under control of the television studio, it is possible to extract a main component and two side panels. The main component will be a conventional television signal suitable for (for example) an NTSC standard broadcast. Conventional NTSC television receivers will display the center signal in the conventional format without notice to a viewer.

The left and right panels which are stitched to the main signal by HDTV television receivers occupy a time duration of 6.5 microseconds and any panel overlap time. Using a one line delay 18, right and left panels of two consecutive decimated lines are available to multiplexer 19. The signals input to multiplexer 19 represent left and right panels for these consecutive decimated lines.

Time expanders 20, 22 are employed to expand the center NTSC compatible component and to expand each of the NTSC panels to a duration for efficiently using the time allotted for a line of the augmentation signal. The line of the augmentation signal is referred to as the super line, as it occupies the same amount of time as two horizontal lines of the NTSC standard signal.

As is shown in FIG. 3, each of the components to be transmitted as an augmentation signal component has a unique time budget associated with it. This unique time budget has been selected such that all the components can be assembled in a super line packet, having a duration of 127.11 microseconds. The particular time budget allotted to each component is not critical to the implementation of the invention, however, selecting a time frame of two standard NTSC lines may simplify hardware implementation.

Figure 4:
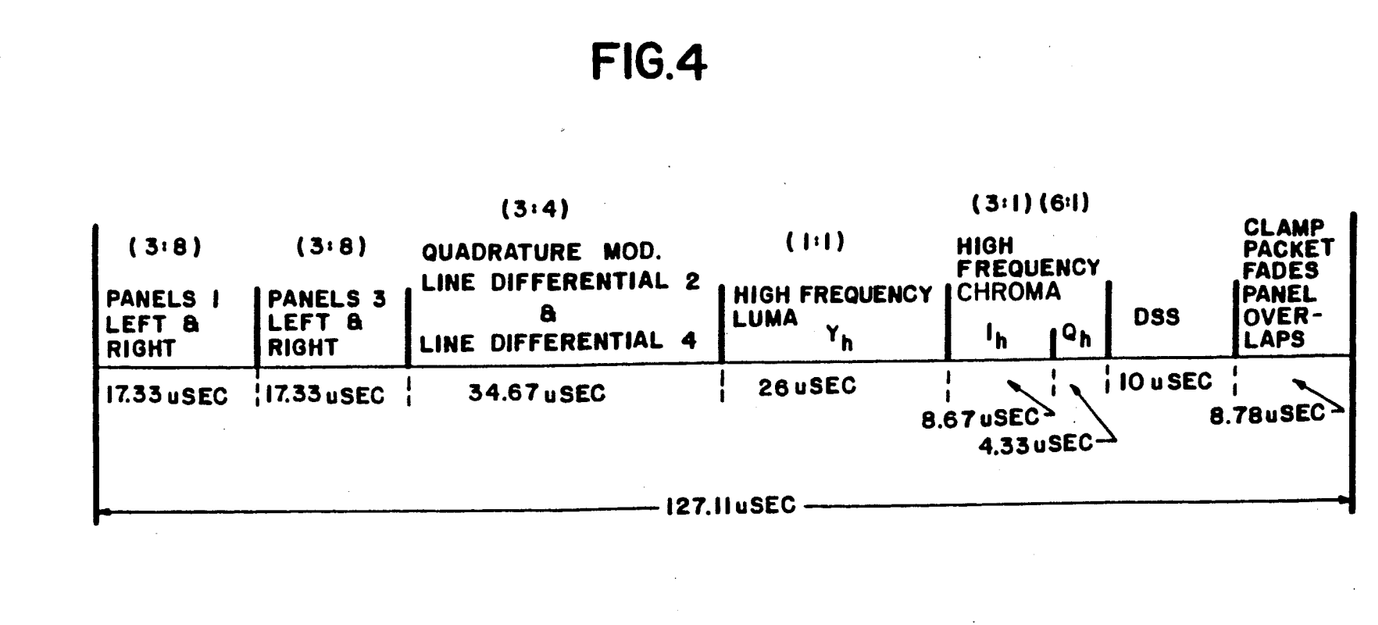
FIG. 4 illustrates the augmentation signal super line timing budget.

Turning now to FIG. 4, there is shown the time frame which comprises an augmentation channel super line. The time frame includes the budgeted time slots for each signal component of the augmentation channel. The first includes the left and right panels to be stitched with a line of NTSC standard video signal. The second time slot includes the panel associated with an alternate line. As only alternate lines are transmitted for the NTSC center main channel, the first and second time slots include all the panel information for two consecutive lines of the transmitted NTSC center signal.

A quadrature modulated line differential signal occupies the third time slot for a duration of 34.67 microseconds. The high frequency luma Yh and high frequency chrominance components Ih and Qh follow. The augmentation super line provides time for the digital stereo signal as well as for a training signal. The vertical interval training signal (VITS) may include information such as a phase reference for the line differential subcarrier fLd, the color subcarrier for the NTSC left and right panels and main component, and a level for adjusting the gain level in the receiving decoder. In addition, the pan and scan, and pointer information for stitching together the side panels and main panel may be sent during this interval. Additionally, although not shown specifically in the augmentation channel super line timing budget, packet fades are provided between time slots to avoid the consequences of a sudden data change. Packet fades are, of course, standard techniques for minimizing the impact of transitions between time slots. In addition, a clamping interval is shown for the augmentation channel super line to establish DC levels for the receiving decoding circuitry.

Figure 5:
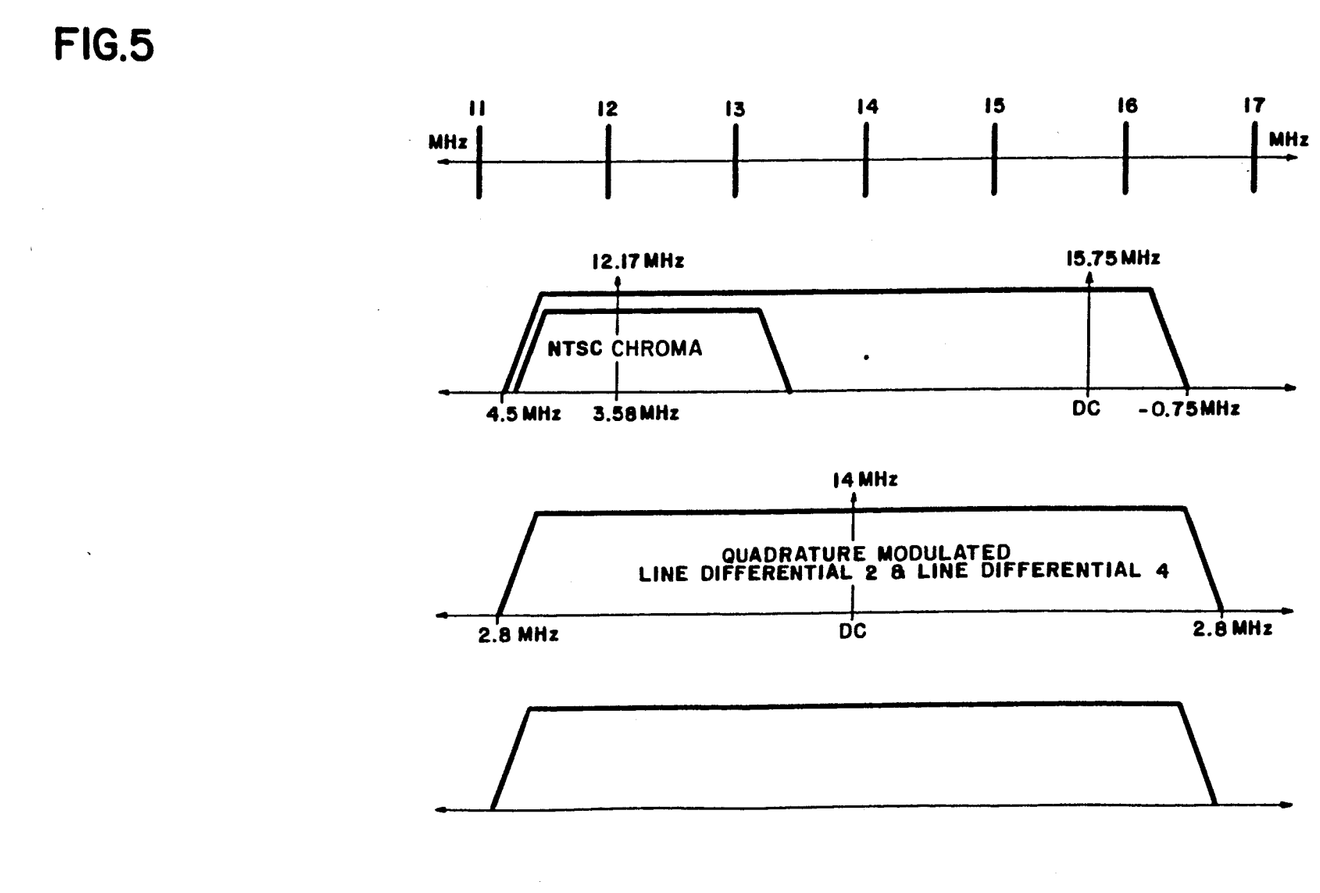
FIG. 5 illustrates the frequency spectrum occupied by the components in the augmentation signal.

The frequency spectrum occupied by the augmentation channel is illustrated more particularly in FIG. 5. FIG. 5 shows a frequency pass band beginning at 11 MHz and ending at 17 MHz. This corresponds to the enhanced luminance and chrominance signal produced by signal path 10 of FIG. 3. The remaining components produced for the augmentation signal are frequency converted so as to lie within this pass band. The expanded quadrature modulated line difference signals are modulated on a subcarrier of 14 MHz, and therefore lie within the required pass band. Additionally, the compressed NTSC left and right panels 1 and 3, which are time multiplexed, are VSB modulated on a 15.75 MHz subcarrier. The upper sideband of this modulation process is partially suppressed to form the VSB signal, leaving the lower sideband which lies in the required pass band of 11 to 17 MHz.

Finally, of course, the high frequency enhancement components comprising Yh, Ih and Qh which are time multiplexed in accordance with the time frame illustrated in FIG. 4, also lie between 11 and 17 MHz. Thus, all of the required augmentation signal components are established in the appropriate 6 MHz bandwidth, without resorting to frequency interleaving which would necessarily produce objectionable artifacts and the usual problems of separating interleaved frequency signals.

Figure 6A:
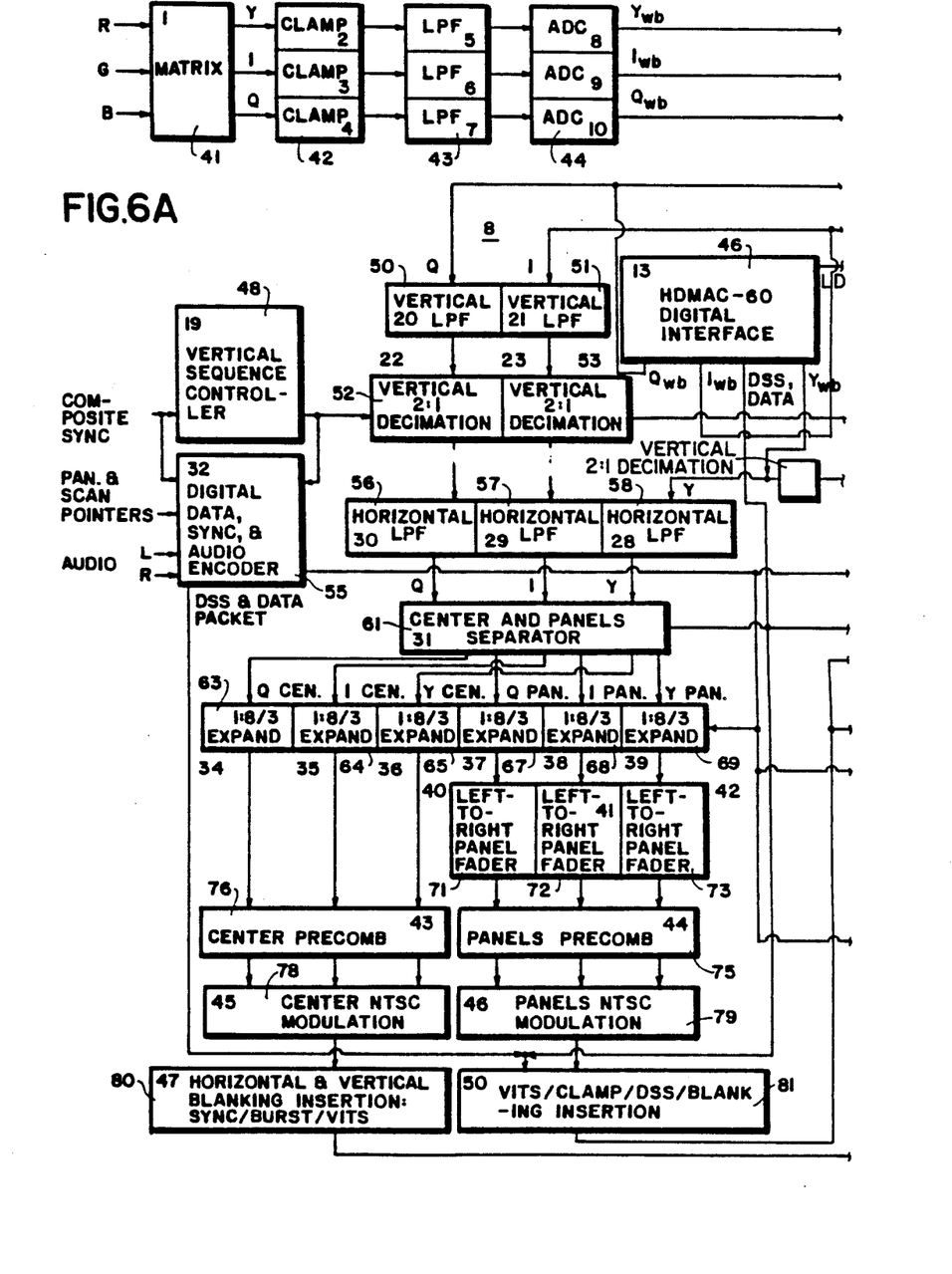
FIGS. 6A, 6B and 6C illustrate an encoder for encoding RGB high definition signal source information into an augmentation signal.
Figure 6B:
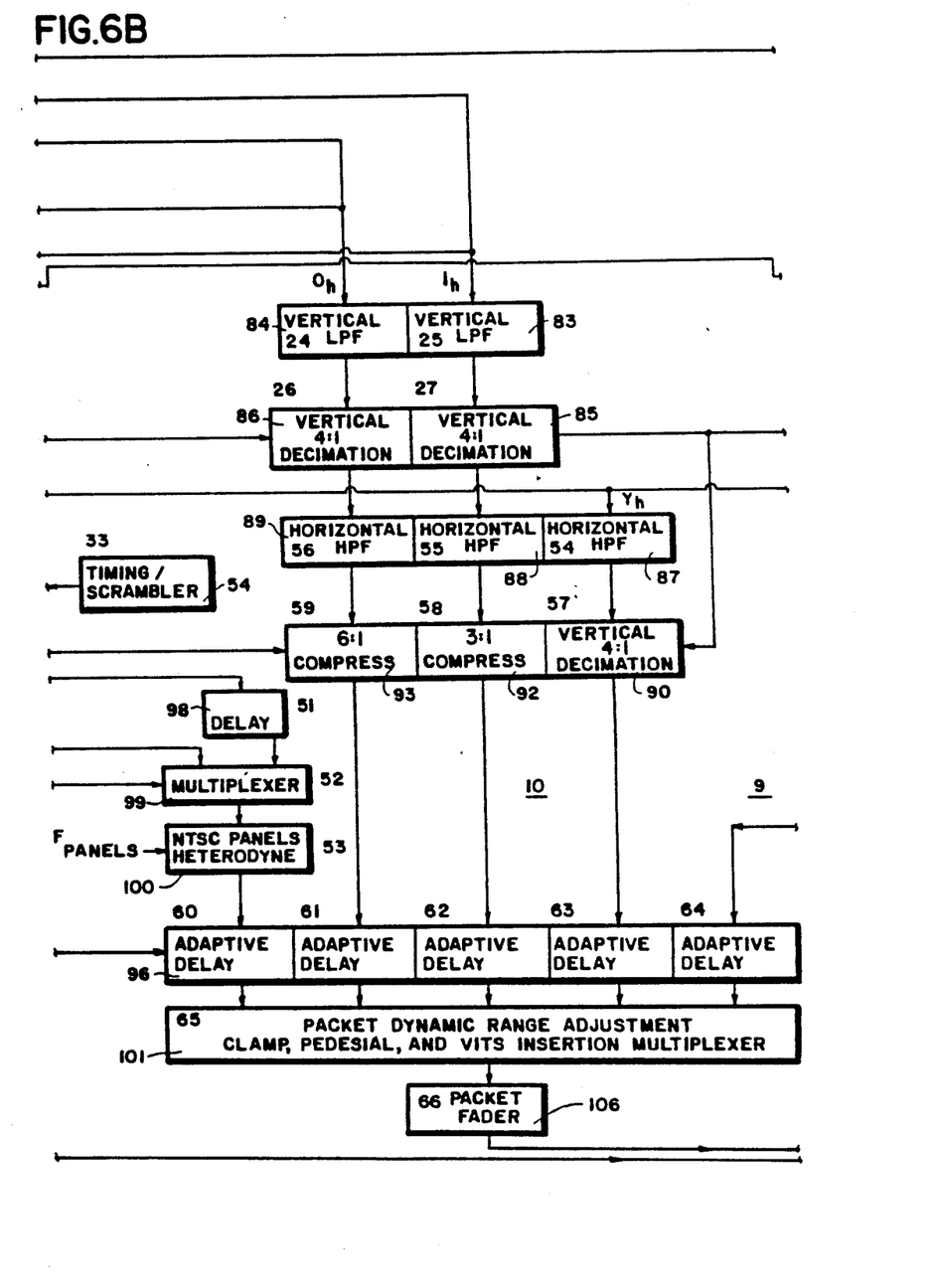
Figure 6C:
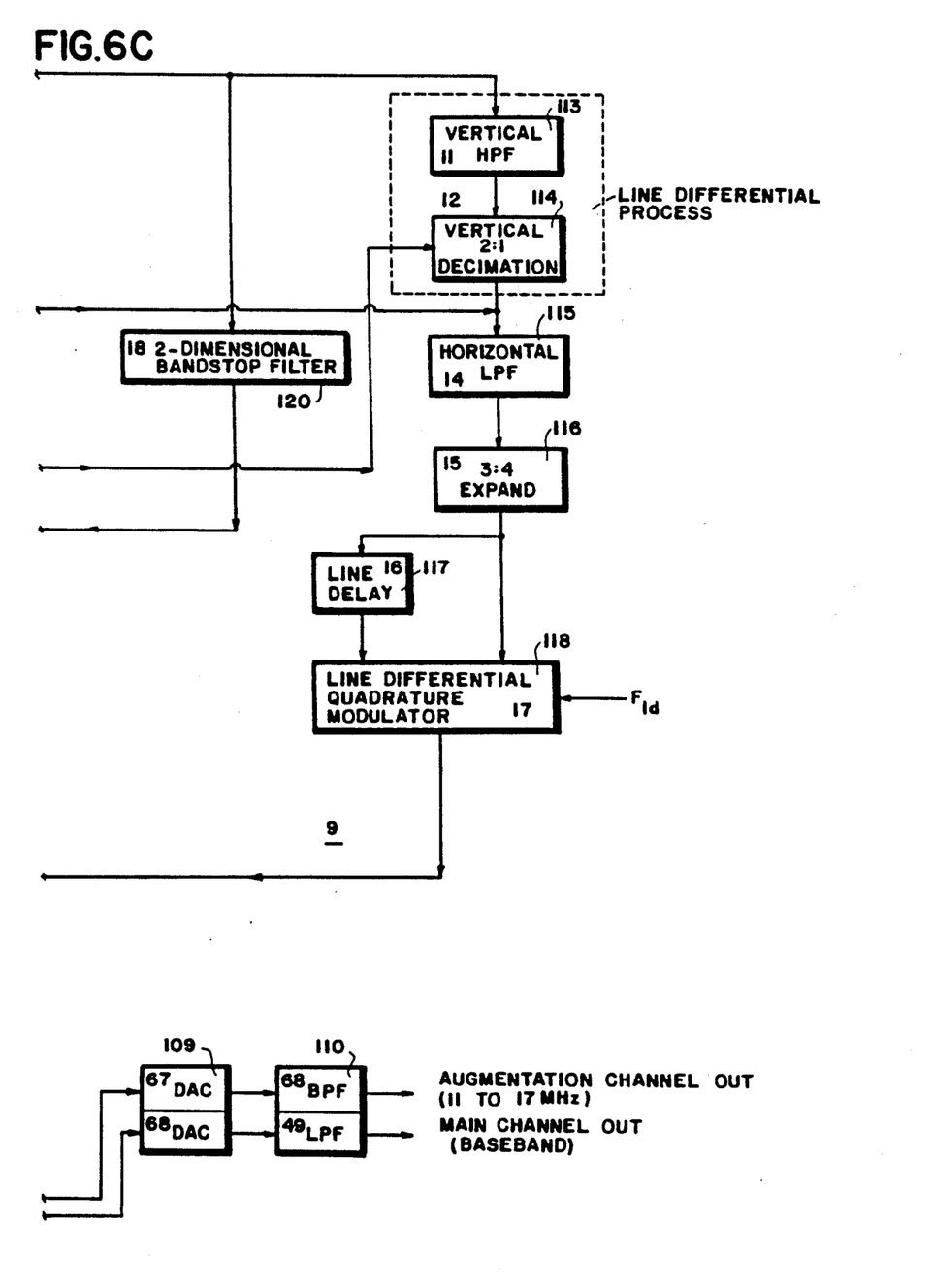

Referring now to FIGS. 6A, 6B and 6C, there is shown a detailed block diagram of an HDNTSC encoder for generating each of the augmentation signal components, as well as a main signal component for transmitting over a main channel and an augmentation channel.

The encoder of FIGS. 6A-6C is capable of reducing RGB 525 progressive line television signals into the required augmentation and main channel signals, as well as generating the main channel and augmentation signal from an HD-MAC-60 signal source. An HD-MAC-60 digital interface 46 is shown which, when connected to a standard satellite link, will convert the HD-MAC signal components into the augmentation and main channel components of the present invention. The two alternate sources are illustrated to demonstrate the capability of producing from either source the augmentation signal components in accordance with the present invention.

The RGB inputs from a standard 525 line progressive scan video camera are applied to a matrix 41. The standard Y, I and Q signals are produced which are applied to clamp circuits 42. Low pass filters 43 filter the clamped Y, I and Q signals to within a known baseband signal spectrum.

The encoder shown in FIGS. 6A-6C will process the video signals in a digital format and then convert them to analog signal levels prior to transmission over the augmentation channel or the main channel. It is to be remembered that the digital implementation shown is not exclusive of other compatible analog techniques. The digital processing, however, lends itself to large scale integration techniques and is therefore preferred.

Three analog to digital converting circuits 44 convert the Y, I and Q signal levels into digital equivalents.

The encoder of FIGS. 6A-6C employs the basic signal paths 8, 9 and 10 as described with respect to FIG. 3. The signal path 8 provides the NTSC center main component, which is compatible with present low definition television receivers. The panels are provided to increase the aspect ratio of standard NTSC video signal.

The main channel signal processing circuit 8 is shown which includes two vertical low pass filters 50 and 51. These filters will restrict the bandwidth of these signals above a bandwidth of 240 TVL.

Vertical low-pass filters used in circuit 8, for example 50, 51 and 2D filter 120, attenuate high frequency components, as discussed in U.S. Ser. No. 077,557, filed July 24, 1987 and incorporated by reference herein. These digital filters can have coefficients which are not balanced, for example $\frac{1}{8}$, $\frac{1}{2}$, $\frac{1}{8}$, in order to attenuate, but not eliminate, certain frequencies. Two vertical decimation circuits 52 and 53 decimate by a ratio of 2:1 the I and Q line signals produce by the analog to digital converters 44. The decimation controller is established by sequencer 48. The decimated signals are applied to horizontal low pass filters 56, 57 having a bandwidth of approximately 4 and 1.65 MHz, respectively, for the Q and I chrominance signal components. The HD-MAC-60 interface 46, if used as a source of high definition video signals, would, of course, have the corresponding outputs connected at this point.

The main center NTSC compatible video signal and the associated panels for the wide aspect ratio high definition signal are derived in separator 61. Separator 61 will, under control of the pan and scan pointers, create the center and panel images in accordance with instructions from a camera operator. With the HD-MAC-60 interface, these signals are created by the original video source and applied to the digital data sync and audio encoder 55.

The center main NTSC signal is applied via its luminance Y and chrominance I and Q signals to time expanders 63, 64 and 66. The expanders will expand these video signal components to a conventional line width. The I and Q signals are combined together in 76 and an NTSC compatible signal is provided by combining a subcarrier modulating the I and Q signals in quadrature, located at the standard 3.58 MHz with the luminance signal provided from expander 66. Horizontal and blanking signal components, as well as colorburst is added by the insertion circuit 80 to form the main channel.

The panels are formed from expanders 67, 68 and 69. Panel fading circuitry 71, 72 and 73 is provided to permit a smooth transition from a panel to the main signal component.

Each of the regenerated panels is prefiltered in 75 and then applied to a conventional NTSC modulation circuit 79. Here, the I and Q components for the panels are quadrature modulated on a subcarrier at 3.58 MHz, as well as combined with the luminance for the panels.

Additionally, a VITS signal is inserted in insertion circuit 80 along with the digital stereophonic sound packet. The training signal is used to decode the appropriate stitch points as well as provide other calibration and clamp levels. VITS signals are added to both the panel signal vertical interval and the main NTSC vertical input. These VITS signals provide various calibration signals such as a reference phase for any subcarrier regeneration circuit used in the HD decoder.

The panel signals are applied to a line delay 98 and multiplexer 99 respectively. This will provide for left and right panels of alternate lines to be applied to multiplexer 99. Multiplexer 99 is gated to insert the alternate panel signals in the time frame associated with FIG. 4. The resulting panels are modulated on the selected subcarrier in modulation circuit 100 to center the left and right panels at 15.75 MHz as is shown in FIG. 5.

Thus, the standard NTSC main channel has been shown, along with the panels for insertion in the augmentation super line time frame.

The other components of the augmentation signal super line time are assembled in the adaptive delays 96. This will permit each of the components for the augmentation signal to be accurately located in the time slot dedicated for the signal component.

The signal path 10 provides for the high frequency luminance and chrominance enhancement components for extending the bandwidth of the television signal. Vertical low pass filters 83 and 84 receive the Iwb and Qwb signals from the camera. Of course, where an HC-MAC-60 source 46 is used, these outputs are already provided. The vertical low pass filters for the chrominance signal are selected to have some suppression above 240 TVL vertically. Vertical decimation in a ratio of 4:1 is accomplished in decimating circuits 85 and 86. The decimation scheme is under control of the vertical sequence controller 48. At each frame, a new beginning line for the decimation process may be selected so that after four frames have occurred, every line number for the four frames has been passed to the horizontal high pass filters 88 and 89. Other decimation schemes are possible.

A horizontal high pass filter 87 is also provided for the high frequency luminance component. A two dimensional frequency band stop filter 120 is provided suppressing luma diagonals and general bandwidth characteristics shown in FIG. 1. The horizontal bandwidth for high pass filter 87 is selected to be from 11.2 MHz to the cutoff frequency of 16.8 MHz.

The high frequency luminance component is, of course, vertically decimated by a ratio of 4:1 in decimation circuit 90. Time compression in circuits 92 and 93 compress the I and Q decimated components to the required time budget of FIG. 4. Adaptive delays are provided in 96 to insert the resulting high frequency enhancement luminance and chrominance in its appropriate time slot.

The signal path 9 representing line differential signal components comprises a vertical high pass filter 113 connected to a vertical decimation circuit 114. The vertical sequence controller 98 decimation circuit is connected with a sequencer to provide for a new decimation line for each frame, so that after two frames, each line number has been passed. The horizontal low pass filter 115 is selected to cut off frequencies which lie substantially above 3.7 MHz. A time expansion circuit 116 will expand the LD information to the required dedicated time slot of FIG. 3. A line delay 117 will provide each consecutive decimated line differential signal to the input of quadrature modulator 118. The quadrature modulator 118 has a subcarrier frequency FLD selected to be 14 MHz.

The output of the to quadrature modulator 118 is applied to the adaptive delay 96.

The adaptive delay 96 will arrange each of the received components of LD, Yh, Ih, Qh and panels in the appropriate time slot of the augmentation signal super line. A packetizer 101 completes the line construction. Additionally, the VITS training signal and a clamp signal are provided. Fading between time intervals is provided by the packet fader 106.

Digital to analog converter 109 and bandpass filter 110 create the required analog voltage, constituting the augmentation channel and the main channel. The main channel may be a conventional NTSC standard transmission channel. The augmentation channel may be a second unused NTSC standard channel. In any event, these signals can be modulated onto any broadcast carrier at the selection of those skilled in the art.

Figure 7A:
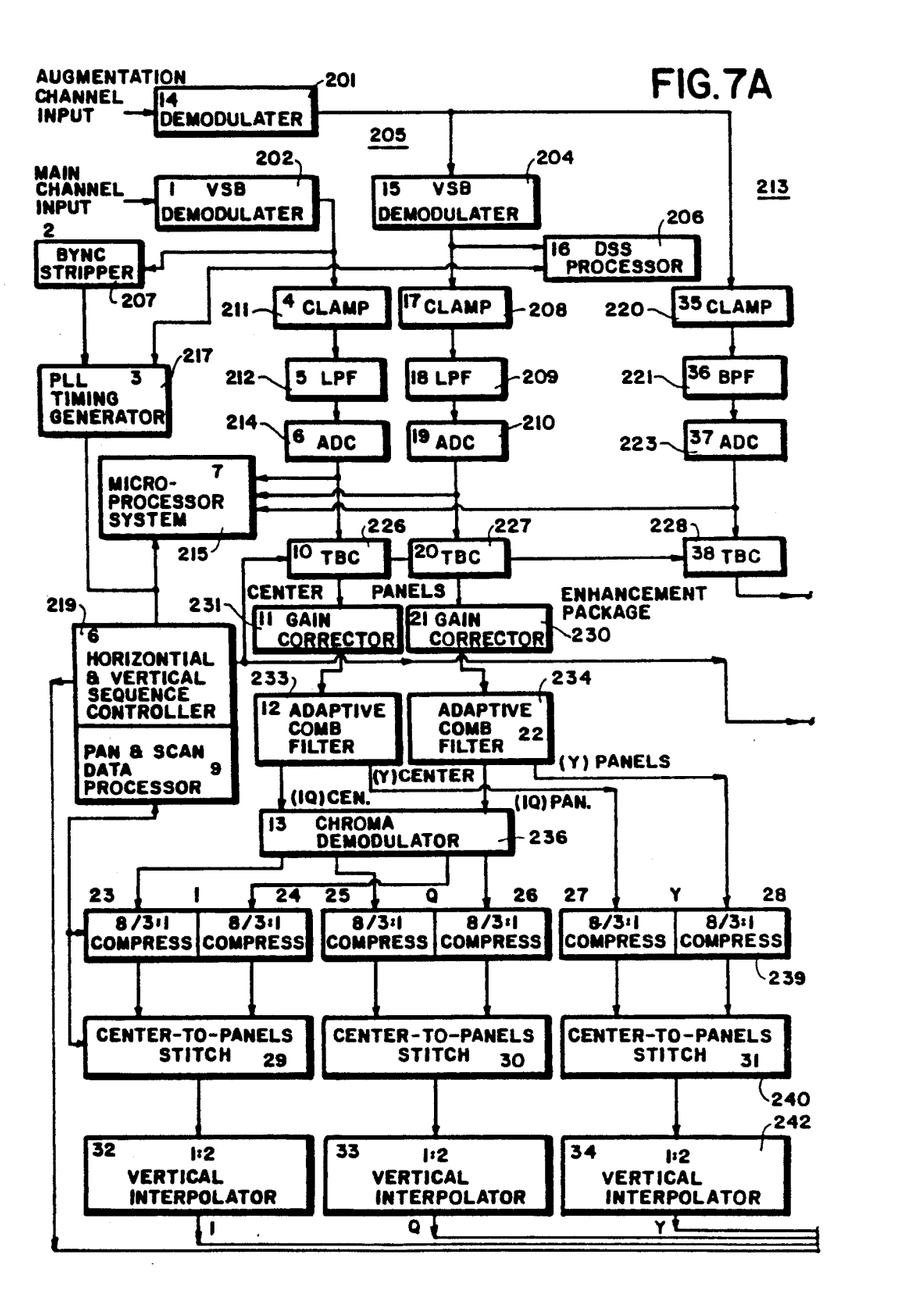
FIGS. 7A and 7B illustrate a demodulating technique for the encoded signal of FIG. 4 and for combining an augmentation channel signal with a main channel signal to produce a high definition television signal.
Figure 7B:
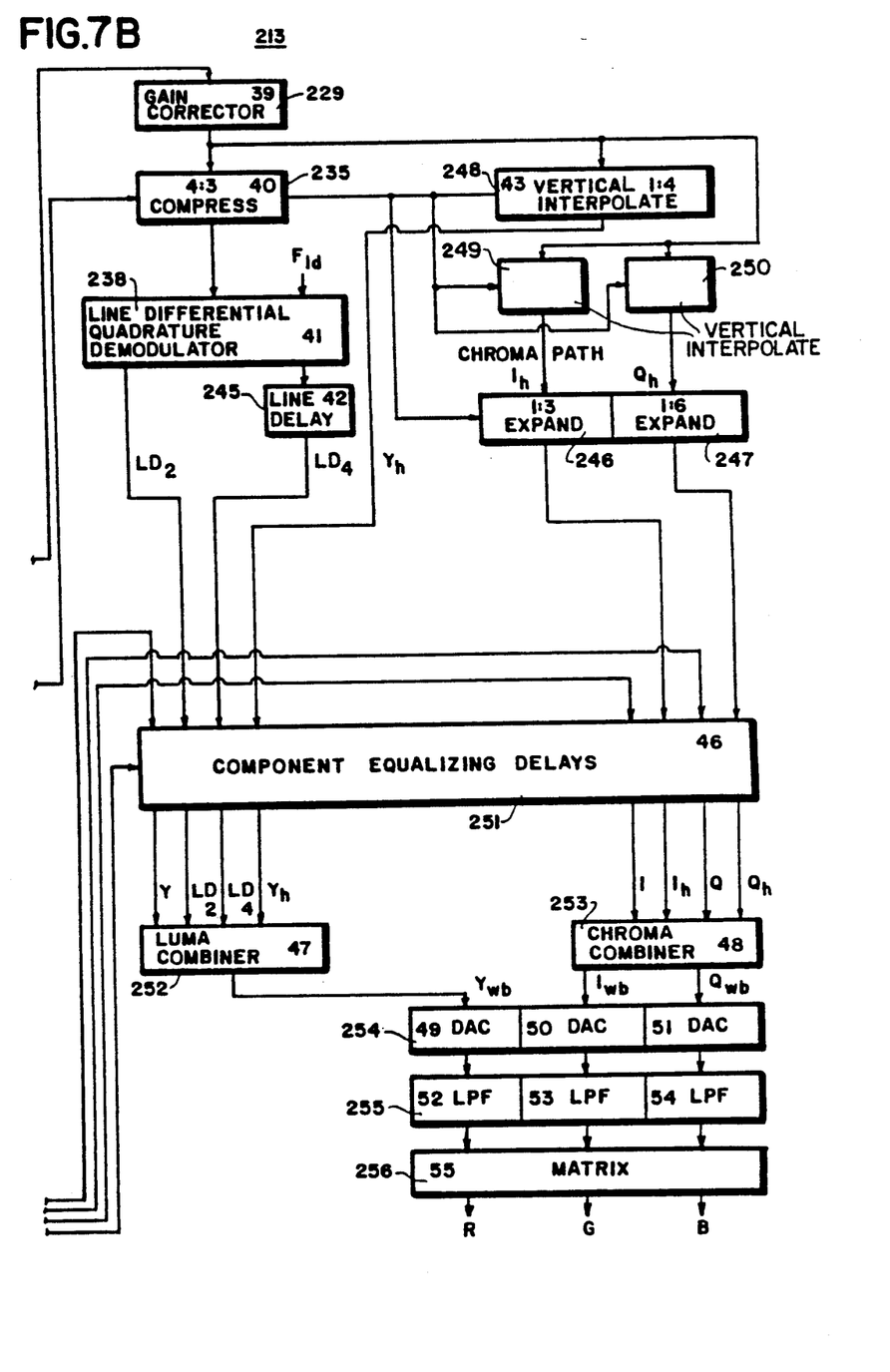

FIG. 7A and 7B illustrate a decoder block diagram useful for constructing a high definition, wide aspect ratio signal from the signal components transmitted by the encoder of FIGS. 6A, 6B and 6C. An augmentation channel input is shown connected to a demodulator 201. It is assumed, of course, that the augmentation channel and main channel have been conveyed by for example cable means or standard channels of the television spectrum to the decoding circuitry. The demodulator 201 will remove the augmentation baseband signal from whatever carrier may have been utilized to transmit the augmentation channel signal. The demodulated signal is applied to two signal paths 205 and 213. Signal path 205 will process the NTSC panels and digital audio, while signal path 213 will process the enhanced luminance and chrominance Yh, Ih and Qh signal information and quadrature LD information. The main channel is applied to a vestigial sideband demodulator 202, and it is processed to derive the NTSC compatible signal, as well as the panel signals needed to create the wide aspect ratio image.

Turning first to the main channel signal processing, the modulator 202 will create the baseband main channel signal from the VSB-AM signal on a channel carrier. A sync stripper 207 is shown which will remove any synchronization information which may have been placed on the main channel signal to assist NTSC conventional receivers in demodulating and displaying the NTSC compatible main channel signal.

Timing is provided by a timing generator 217 which is synchronized with the horizontal synchronization information which was inserted on the main channel signal. The timing generator will provide a line time scan to the microprocessor system 215 and to the horizontal and vertical sequence controller 219. In conjunction with the VITS, this can establish an accurate phase reference.

A clamping circuit 211 will clamp the input analog NTSC compatible main channel signal to a reference DC level. Low pass filter 212 will suitably limit the spectrum of the baseband signal. As was true with the encoder circuit, digital processing is the preferred, but not only, technique for processing this information. An analog to digital converter 214 will provide a digital signal from low pass filter 212.

As was evident from the description of the encoder, various vertical interval test signals (VITS) are sent during the vertical blanking interval of the NTSC main signal during the panel vertical interval of the augmentation signal. During these intervals, the ADC output circuits 210 and 214 will apply the vertical interval test signal to the microprocessor system 215. Additionally, the VITS data contained in the augmentation signal super line is supplied from ADC 223 to the microprocessor system 215.

The vertical interval test signals are used to establish gain and DC levels, as well as phase references for the chroma demodulator 236 for the standard NTSC signal, and a quadrature line demodulator 238. The VITS signals will provide the required phase reference for each of these demodulating circuits. Additionally, the microprocessor system 215 will decode the data transmitted during each augmentation signal super line and provide for synchronization between timing control TBC circuits 226, 227 and 228. The synchronization data will permit more accurate synchronization of the incoming video signal than standard NTSC video synchronization. These control circuits comprise memories which will receive the data from the analog to digital converters and time them with respect to each other so that they are processed in synchronism.

Each of the signals which are timed by TBC circuits 226, 227 and 228 are further gain corrected by gain corrector circuits 229, 230 and 231. These gain correctors are set for an amplitude level corresponding to a decoded VITS signal sent during the vertical interval of the main channel NTSC signal and the augmentation signal.

Having thus time and gain corrected the NTSC compatible main signal, the panel signal and the Qh, Ih, Yh, LD signals, the NTSC main channel signal and panel signals may be luma/chroma separated and chroma demodulated. An adaptive comb filter 233 and 234 will separate the luminance and chroma signal portions for the center and panels signals respectively. A chroma demodulator 236 will convert the chroma signal into I and Q component chrominance signals. Compression, as effected in circuit 239, will restore the chroma and luminance to their previously unexpanded levels. The stitching of the panels to the center signal is accomplished in circuit 240, under control of the pan and scan data processor. As is common with the previous 2 channel system, this stitching occurs in accordance with data sent as a data packet during the vertical blanking interval.

Vertical interpolation in circuit 242 restores the full 480 active lines to the video frame, in both the luminance and chrominance components.

The enhanced luminance, chrominance components and quadrature LD are provided by signal path 213. A clamp circuit 220 restores a DC level for the received LD analog signal. A bandpass filter 221 will remove any received signal components not within 11 through 17 MHz bandwidth. The analog to digital converter 223 will provide the corresponding digital signal for processing.

Once the derived high frequency enhancement signal has been time corrected in TBC 228 and gain corrected in circuit 229, the line differential signal is separated in line differential quadrature demodulator 238. A compressor 235, under control of the horizontal and vertical sequence controller 219, will restore the LD signal to its previous, unexpanded time limits. The restored line differential signal is quadrature demodulated in demodulator 238. Using the line delay 245, the first and second consecutive line differential signals, LD2 and LD4, are derived. Synchronization of the quadrature demodulator 238 with a VITS signal is effected by the microprocessor system 215.

The high frequency enhancement signal is restored in three vertical interpolators 248, 249 and 250. These interpolators are under the control of the horizontal and vertical sequence controller 219. Restoration occurs in a sequence which is established by the decimation sequence in the encoder. As there are three distinct components to be restored, i.e., high frequency luminance Yh, Ih and Qh chrominance, three vertical interpolators are shown.

Interpolation of decimated video frames is, of course, known in accordance with the MAC system. The restored frames are then time expanded in expanders 246 and 247. Thus, high frequency chroma, high frequency luminance is available for combination with the stitched NTSC video signal.

Each of the restored components, LD2, LD4, Yh, Ih, Qh and the main NTSC video signal components, I, Q and Y, are further compensated in circuit 251 for any signal processing delays. It is necessary to align each of these components in time to fully restore the video picture frame.

The component equalized delays are applied to a luma combiner 252 and chroma combiner 253. The resulting luminance and chrominance components define a wide aspect ratio 525 line progressive scan video image for display. Conventional digital to analog converting circuits 254 and low pass filter 255 provide analog voltages of luminance and chrominance. A standard matrix 256 converts these chrominance and luminance components to an RGB signal.

Thus, there is described in detail a decoder circuit which will demodulate the line differential signals and restore the high frequency luminance and chrominance components such that they may be added with the previously known wide aspect ratio image information.

What is claimed is:

1. A system for generating a high definition television augmentation line signal comprising:
   a high definition television signal source providing luminance and chrominance signals;

means for producing at least one high frequency enhancement signal from said luminance and chrominance signals;

means for producing a panel signal from said high definition television signal and for modulating said panel signal on a first subcarrier;

means for producing a line differential signal from said high definition television signal, and modulating said line differential signal on a second subcarrier; and means for sequentially combining in a time frame of a fixed duration said modulated line differential signal, said modulated panel signal and said high frequency enhancement signal, whereby said augmentation line signal is produced.

2. The system of claim 1 wherein said line differential signal is combined in quadrature with a previous line differential signal and then modulated on said second subcarrier.

3. The system of claim 1 further comprising:

means for separating said high frequency enhancement signal into a luminance and first and second chrominance signal portions;

means for time compressing said first and second chrominance portions; and, means for inserting said enhancement signal luminance, and first and second time compressed chrominance portions in time distinct intervals of said time frame.

4. The system of claim 1 further comprising means for time expanding said decimated line differential signal.

5. The system of claim 1 wherein first and second panel signals are included in said time frame.

6. In a system for transmitting HDTV augmentation signals, wherein a time frame is generated representing lines of picture information, including left and right panel information, line differential information, high frequency luminance information and high frequency chrominance information, a decoding apparatus comprising:

a demodulator circuit for separating said augmentation signal from a transmission carrier;

a vertical interpolator for creating vertical lines of high frequency luminance and high frequency chrominance from said time frame high frequency luminance and chrominance information;

means for demodulating line differential information contained in said time frame;

means for combining said high frequency interpolated luminance with said line differential signal to provide an enhanced luminance signal; and means for combining said enhanced luminance signal with a standard NTSC luminance signal, and said enhanced chrominance signal with a standard NTSC chrominance signal, whereby an HDTV video signal is produced.

7. The decoding apparatus of claim 6 further comprising means for time expanding said enhanced luminance and chrominance signal.

8. The decoding apparatus of claim 6 wherein said means for demodulating comprises a quadrature demodulator connected to demodulate first and second line differential signals in said time frame.

9. A method for processing a high definition television (HDTV) signal comprising the steps of:

(a) deriving a standard television signal from said HDTV signal;

(b) deriving at least one high frequency enhancement signal with a predetermined frequency range and at least one low frequency enhancement signal from said HDTV signal;

(c) modulating said low frequency enhancement signal onto a subcarrier having a frequency within said predetermined frequency range thereby forming a modulated subcarrier signal; and (d) time multiplexing said high frequency enhancement signal and said modulated subcarrier signal.

10. The method of claim 9 wherein at least one low frequency enhancement signal comprises first and second enhancement signals; and wherein said first and second enhancement signals are quadrature modulated onto said subcarrier.

11. Apparatus for processing a high definition television (HDTV) signal comprising:

(a) means for deriving a standard television signal from said HDTV signal;

(b) means for deriving at least one high frequency enhancement signal with a predetermined frequency range and at least one low frequency enhancement signal from said HDTV signal;

(c) means for modulating said low frequency enhancement signal onto a subcarrier having a frequency within said high frequency enhancement signal thereby forming a modulated subcarrier signal; and (d) means for time multiplexing said high frequency enhancement signal with said modulated subcarrier signal.

12. A system for improving the horizontal resolution of an HDTV television signal which includes a high frequency enhancement signal having luminance and chrominance components comprising:

means for decimating said high frequency enhancement signal to produce a decimated enhancement signal having decimated luminance components and chrominance components;

means for time compressing said chrominance components;

means for producing consecutive line differential signals from said television signal;

means for decimating said consecutive line differential signals;

means for modulating decimated line differential signals on a subcarrier;

means for inserting said modulated subcarrier, said time compressed chrominance components, and said decimated luminance enhancement signal in a time frame for transmission on an augmentation channel for said HDTV signal.

13. The system of claim 12 wherein said time frame is greater than the duration of one line of said HDTV signal.

14. The system of claim 13 wherein said time frame is substantially 127.11 usec.

15. A high definition television television system wherein a first signal and a second signal are derived from a high definition television signal and wherein said first and second signals are transmitted separately and can be received and combined to provide a high definition television display, said system comprising:

means for deriving as said first signal a conventional television signal which can be directly received by and viewed as a conventional television display on a conventional television receiver;

means for deriving a plurality of enhancement signals which can be combined with said conventional television signal to provide a high definition television display having horizontal and vertical resolution which is higher than that of said conventional television display; and means for time multiplexing said enhancement signals with an audio signal to form said second signal, said second signal having a line interval which is greater than a standard television line interval.

16. The system of claim 15 wherein said second signal has a line interval which is twice the standard television line interval.

17. The system of claim 15 wherein said enhancement signal deriving means comprises means for quadrature modulating a correlated pair of said enhancement signals onto a subcarrier thereby creating a quadrature modulated enhancement signal and a plurality of remaining enhancement signals.

18. The system of claim 17 wherein said time multiplexing means comprises means for time multiplexing said remaining enhancement signals and said quadrature modulated enhancement signal.

19. A receiver for use in a high definition television system comprising:
(a) means for receiving first and second television signals derived from a high definition television signal and transmitted separately, said first signal being a conventional television signal which can be directly received by and viewed as a conventional television display on a conventional television receiver, and said second signal comprising a plurality of enhancement signals time multiplexed with an audio signal, said second signal having a line interval which is greater than a conventional television line interval; and
(b) means for demultiplexing said enhancement signals and combining them with said conventional television signal to provide a high definition television display having horizontal and vertical resolution which is higher than that of a conventional television display.

* * * * *